Patented May 5, 1942

2,281,956

UNITED STATES PATENT OFFICE 2,281,956

HORMONE-LIKE ACTING PRODUCT AND PROCESS OF MANUFACTURING THE SAME

Walter Salzer, Wuppertal-Elberfeld, Germany, assignor to Winthrop Chemical Company, Inc., New York, N. Y., a corporation of New York No Drawing. Application June 20, 1940, Serial No. 341,437. In Germany June 5, 1939

19 Claims. (Cl. 260—613)

This invention relates to certain new hormone-like acting products and to processes of manufacturing the same.

In accordance with the present invention hormone-like acting products are obtainable by reacting upon an alkoxy-phenyl-acetone-alkali metal compound in the presence of an organic solvent which is inert to the starting materials with an alkoxy-phenyl-methylhalide

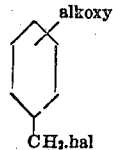

or with a 2-(alkoxy-phenyl)-ethylhalide

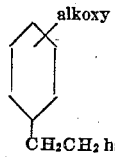

subjecting the 1-(alkoxy-phenyl)-1-(alkoxy-phenyl-methyl)-acetones

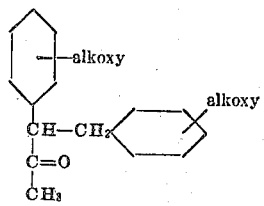

or 1-(alkoxy-phenyl)-1-[2'-(alkoxy-phenyl)-ethyl]-acetones

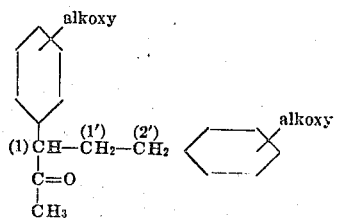

thus formed to ring closure by means of a condensing agent, such as a sulfuric acid and phosphorus oxychloride, and converting the alkoxy groups of the 1-methyl-2-(alkoxy-phenyl-bz-alkoxy-indenes

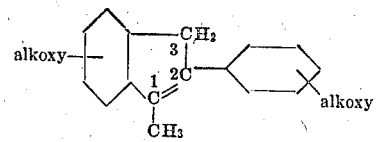

or -bz-alkoxy-3,4-dihydro-naphthalenes

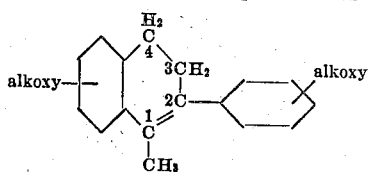

thus obtained into hydroxyl groups by saponification, preferably by means of strong alkalis such as potassium and sodium hydroxide. The ring closure reaction proceeds as follows:

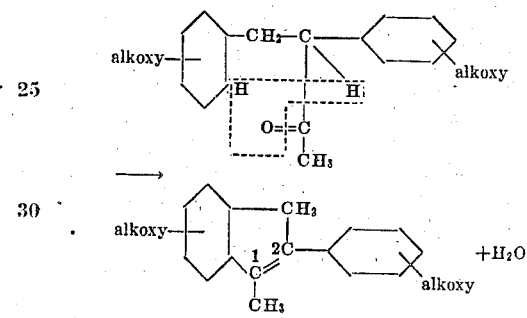

It may be mentioned that the said 1-(alkoxy-phenyl)-1-(alkoxy-phenyl-methyl)- or -(alkoxy-phenyl-ethyl)-acetones are capable of closing a new ring only in view of the presence of the methyl group at the keto group, since other ketones which differ from the said compounds, for instance, only by the presence of an ethyl group instead of the methyl group did not form a new ring when subjected to the same treatment as the compounds specified above. In the said condensation reaction the oxygen atom of the keto group is split off in the form of water. Sulfuric acid or slightly dilute sulfuric acid such as 80% aqueous sulfuric acid and phosphorus oxychloride are preferably used as the condensing agents, but also other media such as acetic anhydride may be used. When starting with an alkoxy-phenyl-methylhalide, 1-methyl-2-(alkoxy-phenyl)-bz-alkoxy-indenes are obtained from the 1-(alkoxy-phenyl)-1-(alkoxy-phenyl-methyl)-acetones primarily obtained as intermediate; when starting with a 2-(alkoxy-phenyl)-ethylhalide, 1-methyl-2-(alkoxy-phenyl)-bz-alkoxy-3,4-dihydronaphphenyl)-1-[2'-(alkoxy-phenyl)-ethyl]-acetones formed as an intermediate. The 1-methyl-2-(hydroxy-phenyl)-bz-hydroxy-indenes and the 1-methyl-2-(hydroxy-phenyl)-bz-hydroxy-3,4-dihydronaphthalenes obtainable from the said alkoxy compounds by saponification are distinguished by a high oestrus activity which is considerably superior to the activity of oestrone.

The invention is furthermore illustrated by the following examples without being restricted thereto:

*Example 1*

10 grams of para-methoxyphenylacetone are heated in 100 ccms. of ether with 2.5 grams of sodium amide-powder and 13 grams of meta-methoxy-benzylchloride on the waterbath during 12 hours. After the addition of water the ethereal layer is separated and dried by means of calcium chloride. The 1-(para-methoxyphenyl)-1-(meta-methoxybenzyl)-acetone distils under 0.5 mm. pressure at 175° C. in the form of a yellow oil. 10 grams of this compound are introduced into 100 ccms. of 80% sulfuric acid and heated to 60–70° C. for 5 minutes. The mixture is then poured on to ice. The 1-methyl-2-(para-methoxyphenyl)-5-(or 7-)-methoxy-indene separates at once in crystalline form. It melts at 110° C. after recrystallization from ethanol. The same product is obtained when using instead of the sulfuric acid 50 ccms. of phosphorus oxychloride evaporating after completion of the reaction the excess phosphorus oxychloride, decomposing the reaction product by means of water and recrystallizing the reaction product from ethanol.

8 grams of the compound thus obtained are heated with 20 grams of potassium hydroxide-powder and 40 ccms. of ethanol in an autoclave to 200° C. for 24 hours. The reaction mixture is then diluted with 100 ccms. of water and the ethanol removed from the mixture under diminished pressure. The aqueous alkaline solution is then acidified and the 1-methyl-2-(para-hydroxyphenyl)-5-(or 7-)-hydroxy-indene extracted with ether. After evaporation of the ether the said product is obtained in the form of an oil. It forms a crystalline di-acetate melting at 131° C. The said di-hydroxy compound causes oestrus with the infantile rat when administered in the dose of 0.2 gamma.

*Example 2*

10 grams of para-methoxyphenyl-acetone are heated in 100 ccms. of ether with 2.5 grams of sodium amide-powder and 13.5 grams of meta-methoxyphenyl-ethylbromide on the waterbath for 12 hours. The mixture is then treated as indicated in Example 1. The 1-(para-methoxyphenyl)-1-(meta-methoxyphenyl-ethyl)-acetone formed distils under 0.8 mm. pressure at 195° C. as a yellow oil.

The said compound is subjected to ring closure by means of sulfuric acid or phosphorus oxychloride as indicated in Example 1. The 1-methyl-2-(para-methoxyphenyl)-3,4-dihydro-6-(or 8-)-methoxy-naphthalene forms crystals which after recrystallization from ethanol melt at 132° C. The 1-methyl-2-(para-hydroxyphenyl)-3,4-dihydro-6-(or 8-)-hydroxy-naphthalene obtained from the said compound after demethylation as indicated in Example 1 forms crystals melting after recrystallization from benzene at 193° C. It has the same activity as the product of Example 1.

*Example 3*

10 grams of para-methoxyphenyl-acetone are reacted in 100 ccms. of ether with 2.5 grams of sodium amide-powder and 13.5 grams of 1-methoxy-2-methyl-3-chloromethyl-benzene in the manner described in Example 1. The 1-(para-methoxyphenyl)-1-(2'-methyl-3'-methoxybenzyl)-acetone distils under 0.2 mm. pressure at 170° C. as a yellow oil. The product is subjected to ring closure as indicated in Example 1. The 1-methyl-2-(para-methoxyphenyl)-4-methyl-5-methoxy-indene forms crystals melting after recrystallization from ethanol at 130° C. The product is demethylated as indicated in Example 1. The 1-methyl-2-(para-hydroxyphenyl)-4-methyl-5-hydroxyindene is obtained in the form of an oil.

The 1-methoxy-2-methyl-3-chloromethyl-benzene boiling under 3 mms. pressure at 90° C. which has been used as starting material is obtained by converting 1-bromo-2-methyl-3-methoxy-benzene by way of its bromo-magnesium compound into the 2-methyl-3-methoxy-benz-aldehyde by reaction with ortho-formic acid ester; the said product which boils under 3 mms. pressure at 95° C. is then converted into the corresponding benzyl alcohol melting at 88° C. by treatment with aluminium isopropylate in isopropylalcohol and the reaction product chlorinated by means of thionylchloride.

I claim:

1. A compound selected from the group consisting of 1-methyl-2-(hydroxyphenyl)-bz-hydroxy-indenes and 1-methyl-2-(hydroxyphenyl)-bz-hydroxy-3,4-dihydronaphthalenes.

2. A 1-methyl-2-(hydroxyphenyl)-bz-hydroxyindene.

3. A 1-methyl-2-(para-hydroxyphenyl)-indene which is substituted in one of the positions 5 and 7 by a hydroxyl group.

4. A 1-methyl-2-(hydroxyphenyl)-bz-hydroxy-3,4-dihydronaphthalene.

5. A 1-methyl-2-(para-hydroxyphenyl)-3,4-dihydronaphthalene which is substituted in one of the positions 6 and 8 by a hydroxyl group.

6. The process which comprises reacting upon an alkoxyphenyl-acetone-alkali metal compound in the presence of an organic solvent which is inert to the starting materials with a compound selected from the group consisting of alkoxy-phenyl-methylhalides and 2-(alkoxyphenyl)-ethylhalides, subjecting the reaction product to ring-closure by means of a condensing agent selected from the group consisting of sulfuric acid and phosphorus oxychloride and converting the alkoxy groups into hydroxyl groups by saponification.

7. The process which comprises reacting upon an alkoxyphenyl-acetone-alkali metal compound in the presence of an organic solvent which is inert to the starting materials with an alkoxyphenyl-methylhalide, subjecting the reaction product to ring-closure by means of a condensing agent selected from the group consisting of sulfuric acid and phosphorus oxychloride and converting the alkoxy groups present into hydroxyl groups by saponification.

8. The process which comprises reacting upon an alkoxyphenylacetone-alkali metal compound in the presence of an organic solvent which is inert to the starting materials with a 2-(alkoxyphenyl)-ethylhalide, subjecting the reaction product to ring-closure by means of a condensing agent selected from the group consisting of sulfuric acid and phosphorus oxychloride and converting the alkoxy groups present into hydroxyl groups by saponification.

9. The process which comprises reacting upon a para-methoxyphenylacetone-alkali metal compound in the presence of an organic solvent which is inert to the starting materials with an alkoxyphenyl-methylhalide, subjecting the reaction product to ring-closure by means of a condensing agent selected from the group consisting of sulfuric acid and phosphorus oxychloride and converting the alkoxy groups present into hydroxyl groups by saponification.

10. The process which comprises reacting upon a para-methoxyphenylacetone-alkali metal compound in the the presence of an organic solvent which is inert to the starting materials with a 2-(alkoxyphenyl)-ethylhalide subjecting the reaction product to ring-closure by means of a condensing agent selected from the group consisting of sulfuric acid and phosphorus oxychloride and converting the alkoxy groups present into hydroxy groups by saponification.

11. The process which comprises reacting upon an alkoxyphenylacetone-alkali metal compound in the presence of an organic solvent which is inert to the starting materials with a meta-methoxyphenyl-methylhalide, subjecting the reaction product to ring-closure by means of a condensing agent selected from the group consisting of sulfuric acid and phosphorus oxychloride and converting the alkoxy groups present into the hydroxyl groups by saponification.

12. The process which comprises reacting upon an alkoxyphenyl-acetone-alkali metal compound in the presence of an organic solvent which is inert to the starting materials with a meta-(methoxyphenyl)-ethylhalide, subjecting the reaction product to ring-closure by means of a condensing agent selected from the group consisting of sulfuric acid and phosphorus oxychloride and converting the alkoxy groups present into hydroxyl groups by saponification.

13. The process which comprises reacting upon a para-methoxyphenylacetone-alkali metal compound in the presence of an organic solvent which is inert to the starting materials with a meta-(methoxyphenyl)-methylhalide, subjecting the reaction product to ring-closure by means of a condensing agent selected from the group consisting of sulfuric acid and phosphorus oxychloride and converting the alkoxy groups present into hydroxyl groups by saponification.

14. The process which comprises reacting upon a para-methoxyphenylacetone-alkali metal compound in the presence of an organic solvent which is inert to the starting materials with a meta-(methoxyphenyl)-ethylhalide, subjecting the reaction product to ring-closure by means of a condensing agent selected from the group consisting of sulfuric acid and phosphorus oxychloride and converting the alkoxy groups present into hydroxy groups by saponification.

15. In the process of the manufacture of condensation products the step which comprises subjecting a compound selected from the group consisting of 1-(alkoxyphenyl)-1-(alkoxyphenylmethyl)-acetones and 1-(alkoxyphenyl)-1-[2'-(alkoxyphenyl)]-acetones to ring closure by the action of a condensing agent selected from the group of sulfuric acid and phosphorus oxychloride.

16. In the process of the manufacture of condensation products the step which comprises subjecting a 1-(alkoxyphenyl)-1-(alkoxyphenylmethyl)-acetone to ring closure by the action of a condensing agent selected from the group consisting of sulfuric acid and phospohorus oxychloride.

17. In the process of the manufacture of condensation products the step which comprises subjecting a 1 - (alkoxyphenyl)1-[2'-(alkoxyphenyl)-ethyl]-acetone to ring closure by the action of a condensing agent selected from the group consisting of sulfuric acid and phosphorus oxychloride.

18. In the process of the manufacture of condensation products the step which comprises subjecting a 1-(para-methoxyphenyl)-1-(meta-methoxyphenylmethyl)-acetone to ring closure by the action of a condensing agent selected from the group consisting of sulfuric acid and phosphorus oxychloride.

19. In the process of the manufacture of condensation products the step which comprises subjecting a 1 - (para-methoxyphenyl)-1-[2'-(meta-methoxyphenyl)-ethyl]-acetone to ring closure by the action of a condensing agent selected from the group consisting of sulfuric acid and phosphorus oxychloride.

WALTER SALZER.